(12) United States Patent
Awadallah et al.

(10) Patent No.: US 9,430,533 B2
(45) Date of Patent: Aug. 30, 2016

(54) MACHINE-ASSISTED SEARCH PREFERENCE EVALUATION

(71) Applicant: Microsoft Corporation, Redmond, WA (US)

(72) Inventors: Ahmed Hassan Awadallah, Redmond, WA (US); Imed Zitouni, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 14/221,688

(22) Filed: Mar. 21, 2014

(65) Prior Publication Data

US 2015/0269156 A1    Sep. 24, 2015

(51) Int. Cl.
*G06F 7/00* (2006.01)
*G06F 17/30* (2006.01)

(52) U.S. Cl.
CPC .................................. *G06F 17/3053* (2013.01)

(58) Field of Classification Search
CPC .......................... G06F 17/3053; G06F 17/30
USPC ......................................................... 707/732
See application file for complete search history.

(56) References Cited

U.S. PATENT DOCUMENTS

| | | | | |
|---|---|---|---|---|
| 8,484,202 B2* | 7/2013 | Radlinski | ......... | G06F 17/30864 707/723 |
| 2004/0215607 A1* | 10/2004 | Travis, Jr. | ......... | G06F 17/30864 |
| 2007/0112759 A1* | 5/2007 | Kulakow | ......... | G06F 17/30646 |
| 2008/0027913 A1* | 1/2008 | Chang | ...................... | G06F 17/30 |
| 2008/0183699 A1* | 7/2008 | Hu | ..................... | G06F 17/30864 |
| 2009/0019030 A1* | 1/2009 | Smolyanskiy | .... | G06F 17/30864 |
| 2009/0327224 A1* | 12/2009 | White | ............... | G06F 17/30864 |
| 2010/0082609 A1* | 4/2010 | Sun | ........................ | G06Q 30/02 707/723 |
| 2011/0087673 A1* | 4/2011 | Chen | ................. | G06F 17/30864 707/748 |
| 2011/0320441 A1* | 12/2011 | Lee | ................... | G06F 17/30867 707/723 |
| 2012/0150837 A1* | 6/2012 | Radlinski | ......... | G06F 17/30864 707/708 |
| 2013/0191310 A1* | 7/2013 | Awadallah | .......... | G06N 99/005 706/12 |

\* cited by examiner

*Primary Examiner* — Binh V Ho
(74) *Attorney, Agent, or Firm* — Steve Wight; Sandy Swain; Micky Minhas

(57) ABSTRACT

Various technologies described herein pertain to evaluating search preferences. A search query, a first search result list returned by a first ranker system responsive to the search query, and a second search result list returned by a second ranker system responsive to the search query are received. A classifier is employed to predict (e.g., based upon values of features of the search query, the first search result list, and the second search result list) whether a search preference judgment (e.g., a side-by-side search preference judgment, etc.) indicates a quality difference between the first search result list and the second search result list. The search query, the first search result list, and the second search result list are excluded from a set of search queries and search result list pairs to be manually judged for search preference judgments when predicted to lack the quality difference.

20 Claims, 12 Drawing Sheets

MACHINE-ASSISTED SEARCH PREFERENCE EVALUATION

BACKGROUND

Information retrieval (IR) systems are traditionally evaluated in terms of relevance of webpages to individual queries. Conventional techniques for evaluating IR systems commonly use test collections and standard evaluation measures where judges are asked to assign an absolute relevance assessment to search results.

More recently, pairwise preference judgments for IR evaluation have gained popularity. With such approaches, preference judgments over two search result lists returned responsive to a common query are obtained from judges. In preference judgment based IR evaluation, judges are asked to indicate their preference for a search result list from one of two paired systems instead of providing an absolute evaluation of a system in isolation.

Preference based evaluation can be employed to directly answer the question "will users prefer A over B?" In contrast, standard measurements on test collections can be indirectly used to predict which system will be preferred by users. Preference judgments may also be easier for assessors to make as compared to absolute judgments, which can result in enhanced reliability of such evaluation.

Unlike traditional query document evaluation, collecting preference judgments over two search result lists takes context of documents, and hence interaction between search results, into consideration. Moreover, preference judgments may provide more accurate results as compared to absolute judgments. However, result list preference judgments typically have high annotation costs and are commonly time intensive.

SUMMARY

Described herein are various technologies that pertain to evaluating search preferences. A search query can be received. Moreover, a first search result list returned by a first ranker system responsive to the search query can be received. Further, a second search result list returned by a second ranker system responsive to the search query can be received. A first classifier can be employed to predict whether a search preference judgment (e.g., a side-by-side search preference judgment, etc.) of the first search result list and the second search result list for the search query indicates a quality difference between the first search result list and the second search result list. The first classifier can predict whether the search preference judgment indicates the quality difference based upon values of features of the search query, the first search result list, and the second search result list. Moreover, the search query, the first search result list, and the second search result list can be excluded from a set of search queries and search result list pairs to be manually judged for search preference judgments (e.g., side-by-side search preference judgments, etc.) when the first search result list and the second search result list for the search query are predicted to lack the quality difference.

According to various embodiments, when the first search result list and the second search result list for the search query are predicted to have the quality difference, then a second classifier can be employed to predict whether the search preference judgment indicates the first search result list or the second search result list is preferred for the search query. The second classifier can predict whether the search preference judgment indicates the first search result list or the second search result list is preferred based upon the values of the features of the search query, the first search result list, and the second search result list. Moreover, a confidence level for whether the search preference judgment indicates the first search result list or the second search result list is preferred as predicted can be determined. The search query, the first search result list, and the second search result list can be excluded from the set of the search queries and the search result list pairs to be manually judged for the search preference judgments when the confidence level is above a threshold value; rather, the search query, the first search result list, and the second search result list can be labeled with the predicted preference between the search result lists. Moreover, the search query, the first search result list, and the second search result list can be inserted in the set of the search queries and the search result list pairs to be manually judged for the search preference judgments when the confidence level is equal to or below the threshold value.

Pursuant to various embodiments, performance of a judge can be tracked. Again, a search query, a first search result list returned by a first ranker system responsive to the search query, and a second search result list returned by a second ranker system responsive to the search query can be received. A prediction of a search preference judgment (e.g., a side-by-side search preference judgment, etc.) of the first search result list and the second search result list for the search query can be generated. Additionally, the search preference judgment of the first search result list and the second search result list for the search query as manually judged by a judge can be received. Moreover, a comparison between the search preference judgment of the first search result list and the second search result list for the search query as manually judged by the judge with the prediction of the search preference judgment of the first search result list and the second search result list for the search query can be performed. Further, performance of the judge can be tracked based at least upon the comparison.

According to various embodiments, a classifier utilized to generate a prediction of a search preference judgment (e.g., a side-by-side search preference judgment, etc.) can be trained. For instance, a set of search queries and search result list pairs can be received. Search result lists in the search result list pairs are respectively returned by a first ranker system and a second ranker system responsive to the search queries. Moreover, manually judged search preference judgments (e.g., manually judged side-by-side search preference judgments, etc.) of the set of the search queries and the search result list pairs can be received. Further, values of features of the search queries in the search result list pairs can be determined. A classifier can be trained based upon the manually judged search preference judgments of the set of the search queries and the search result list pairs and the values of the features of the search queries and the search result list pairs. The classifier can be trained to generate predicted search preference judgments (e.g., predicted side-by-side search preference judgments, etc.).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
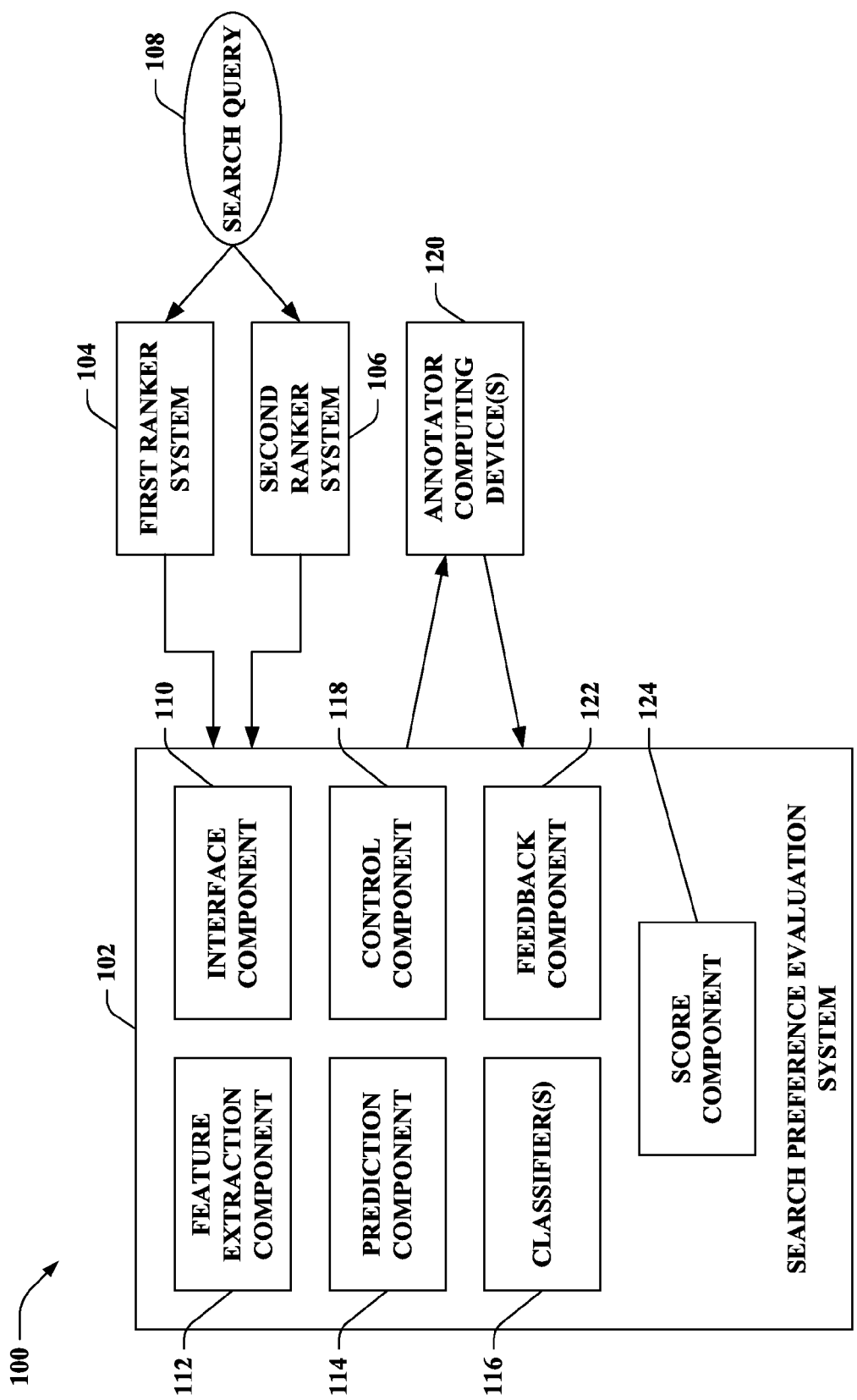
FIG. 1 illustrates a functional block diagram of an exemplary system that evaluates search preference judgments.

Various technologies pertaining to machine-assisted search preference evaluation are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, various techniques for automatically predicting preference judgments on search result list are provided. Such techniques can be utilized to automatically predict user preferences for assisting human judges in order to collect more reliable result list preference judgments at large-scale. The approaches set forth herein can train and/or utilize models (e.g., classifiers) that can be utilized to automatically predict user preference judgments. Accordingly, the models can be used to reduce annotation costs commonly resulting from annotating search preference judgments (e.g., side-by-side search preference judgments, etc.).

Classifier(s) can be utilized to automatically predict search preference judgments on search result lists (e.g., side-by-side search preference judgments). Various features can be used to predict search preference judgments, including relevance-based features, click-based features, features of titles and/or snippets of search results in search result lists, query features, diversity features, and so forth. For instance, a group of such features can be utilized in combination to predict the search preference judgments.

Automatic prediction can reduce costs and time for collecting search preference judgments (as compared to manually obtaining search preference judgments). By way of example, the automatic prediction of the search preference judgments can be solely used to compare ranker systems to each other (e.g., compare a first ranker system to a second ranker system). According to another example, the predicted search preference judgments can be used in a hybrid scenario with manually judged search preference judgments to compare ranker systems. In accordance with an exemplary scenario, the predicted search preference judgments can be used to exclude queries (and corresponding search result list pairs) that are predicted to lack a quality difference between search result lists returned by the two ranker systems (e.g., no difference in quality exists between the two ranker systems). Following this exemplary scenario, the remainder of the queries and corresponding search result list pairs from the two ranker systems can be output to judges for manual judgment of the search preference judgments. According to another exemplary scenario, high confidence predicted results from the search preference judgment prediction can be combined with human judgment for low confidence predicted search preference judgments.

As described herein, a preference judgment is a judgment collection framework where judges are asked to indicate their preference for one ranker system from a pair of ranker systems rather than providing an absolute evaluation of a ranker system in isolation. Moreover, side-by-side is a preference technique where two sets of search result lists are presented side-by-side to users who are asked which of the two search result list they preferred. The term "side-by-side" is intended to include substantially any relative orientation of two search result lists included in a user interface; thus, two search result lists that are presented side-by-side in a user interface can have substantially any relative orientation there between (e.g., up/down, left/right, diagonal, etc.). Moreover, the two search result lists that are presented side-by-side in the user interface can be adjacent or non-adjacent. Further, it is contemplated that other preference techniques are intended to fall within the scope of the hereto appended claims; for instance, two search result lists can be presented during different time periods (e.g., a first search result list can be displayed during a first time period and a second search result list can be displayed during a second time period), on separate displays, or the like.

Referring now to the drawings, FIG. 1 illustrates a system 100 that evaluates search preference judgments. The system 100 includes a search preference evaluation system 102 that predicts search preference judgments (e.g., side-by-side search preference judgments) of search result list returned by ranker systems responsive to search queries.

More particularly, the system 100 includes a first ranker system 104 and a second ranker system 106, collectively referred to herein as ranker systems 104-106. The ranker systems 104-106 can also be referred to as IR systems or ranking functions. The ranker systems 104-106 are systems that take a query and a document collection (e.g., documents in an index of a commercial search engine, documents in a data repository of a computing device, etc.), and return an ordered set of search results (e.g., search result lists). For instance, a search result list is an ordered list of N results returned by a ranker system (e.g., one of the ranker systems 104-106) in response to submitting a particular search query.

The ranker systems 104-106 generate respective search result lists for the same query. According to various examples, the ranker systems 104-106 can be differing search engines, different versions of a common search engine, and so forth. According to another example, the ranker systems 104-106 can be differing sets of search results returned by a common search engine (e.g., search results 1 to 10 versus search results 11 to 20 returned by a particular search engine). According to yet another example, the ranker systems 104-106 can be desktop search tools, product search engines, search engines that provide search engine result pages tailored for specific types of devices (e.g., mobile devices, gaming consoles, etc.), and so forth. However, it is to be appreciated that the claimed subject matter contemplates substantially any type of ranker systems falling within the scope of the hereto appended claims.

A search query 108 can be input to the first ranker system 104 and the second ranker system 106. Moreover, a first search result list can be returned by the first ranker system 104 responsive to the search query 108, and a second search result list can be returned by the second ranker system 106 responsive to the search query 108. The search query 108, the first result list returned by the first ranker system 104 responsive to the search query 108, and the second search result list returned by the second ranker system 106 responsive to the search query 108 can be provided to the search preference evaluation system 102. Moreover, disparate search queries and corresponding search result lists returned by the first ranker system 104 and the second ranker system 106 can similarly be provided to the search preference evaluation system 102.

Assume two lists of search results are produced by the ranker systems 104-106 for the same search query 108. In response to the search query 108, the ranker systems 104-106 return respective ordered lists of N results. According to an example, N can be 10 (e.g., 10 results can be respectively returned in each ordered list as set forth in the following example); however, the claimed subject matter is not limited to N being 10. The first N (e.g., N=10) results (e.g., the first search result page) can be considered, for example. Accordingly, given a list $l_1 = \{U_1, \ldots, U_n\}$, where n≤10 and $U_i$ is the result returned at position i, produced from ranking function $R_1$, and a list $l_2 = \{U_1, \ldots, U_m\}$, where m≤10 and $U_i$ is the result returned at position i, produced from ranking function $R_2$, then the search preference evaluation system 102 can perform various analyses. More particularly, the search preference evaluation system 102 can predict whether $l_1$ and $l_2$ are of similar or different quality. Further, if $l_1$ and $l_2$ are different in terms of quality, then the search preference evaluation system 102 can predict whether $l_1$ or $l_2$ is better.

The search preference evaluation system 102 includes an interface component 110 that receives the search query 108, the first search result list returned by the first ranker system 104 responsive to the search query 108, and the second search result list returned by the second ranker system 106 responsive to the search query 108. Likewise, the interface component 110 can receive disparate search queries and corresponding search result list pairs returned by the ranker systems 104-106 responsive to such disparate search queries. While many of the examples set forth below pertain to the search query 108 and the search result list pair returned by the ranker systems 104-106 responsive to the search query 108, it is to be appreciated that these examples can be equally applicable to the disparate search queries and the corresponding search result list pairs returned responsive to such disparate search queries.

Moreover, the search preference evaluation system 102 includes a feature extraction component 112 that can extract values of features of the search query 108, the first search result list, and the second search result list. Similarly, the feature extraction component 112 can extract values of features of the disparate search queries and corresponding search result list pairs. For instance, the features can include query features, relevance features, click-based features, features of titles, features of snippets, diversity features, a combination thereof, and so forth.

The search preference evaluation system 102 further includes a prediction component 114 that generates a prediction of a search preference judgment (e.g., a side-by-side search preference judgment, etc.) of the first search result list and the second search result list for the search query 108. The prediction component 114 can employ classifier(s) 116 to predict the search preference judgment of the first search result list and the second search result list for the search query 108. The classifier(s) 116 can predict the search preference judgment based upon the values of the features extracted by the feature extraction component 112.

According to an example, the classifier(s) 116 can be binary classifiers. It is contemplated that a common classifier can be utilized by the prediction component 114 to generate various search preference judgment predictions (e.g., the common classifier can be used to predict a quality different and a preferred search result list from a search result list pair). By way of another example, differing classifiers can be used by the prediction component 114 to generate differing search preference judgment predictions (e.g., a first classifier can be used to predict the quality difference and a second classifier can be used to predict the preferred search result list from the search result list pair).

The prediction component 114 can employ the classifier(s) 116 to predict whether the search preference judgment of the first search result list and the second search result list for the search query 108 indicates a quality difference between the first search result list and the second search result list. The classifier(s) 116 can predict whether the search preference judgment indicates the quality difference based upon the values of the features of the search query, the first search result list, and the second search result list obtained by the feature extraction component 112. Additionally or alternatively, the prediction component 114 can employ the classifier(s) 116 to predict whether the search preference judgment indicates the first search result list or the second search result list is preferred for the search query 108. The classifier(s) 116 can predict whether the search preference judgment indicates the first search result list or the second search result list is preferred based upon the values of the features of the search query 108, the first search result list, and the second search result list.

The search preference evaluation system 102 can also include a control component 118 that excludes or inserts the search query 108, the first search result list, and the second search result list in a first set of search queries and search result list pairs to be manually judged for the search preference judgments based upon the prediction of the search preference judgment generated by the prediction component 114. Moreover, the control component 118 can output the first set of search queries and the search result list pairs for manual judging of the search preference judgments to one or more annotator computing device(s) 120. While outputting the first set of the search queries in the search result list pairs for manually judging to the annotator computing device(s) 120, the control component 118 can inhibit a second set of search queries and search result list pairs excluded from the first set from being outputted for the manual judging of the search preference judgments.

It is contemplated that the annotator computing device(s) 120 can include substantially any type(s) of computing devices that can be used for manual evaluation of search preference judgments.

The control component 118 can exclude the search query 108, the first search result list, and the second search result list from the first set of search queries and search result list pairs to be manually judged for the search preference judgments when the first search result list and the second search result list for the search query 108 are predicted by the prediction component 114 to lack a quality difference. Additionally or alternatively, the control component 118 can exclude the search query 108, the first search result list, and the second search result list from the first search result list of search queries and search result list pairs to be manually judged for the search preference judgments when the first search result list and the second search result list for the search query 108 are predicted by the prediction component 114 to have a quality difference with one of the search result lists being predicted to be preferred with a confidence level above a threshold value.

It is to be appreciated that the annotator computing device(s) 120 can include substantially any type of computing devices that can be utilized by judges to manually judge the set of search queries and search result list pairs for the manually judged search preference judgments.

The search preference evaluation system 102 can further include a feedback component 122 that receives the search preference judgment of the first search result list and the second search result list for the search query 108 as manually judged by a judge employing the annotator computing device(s) 120. Further, it is contemplated that the first search result list and the second search result list for the search query 108 can be manually judged by more than one judge; thus, the feedback component 122 can receive the manually judged search preference judgments of the search result list pair for the search query 108 from the annotator computing device(s) 120 of a plurality of judges. The feedback component 122 can receive the search preference judgments of at least a portion of the first set of the search queries in the search result list pairs as manually judged.

Moreover, the search preference evaluation system 102 can include a score component 124 that compares performances of the first ranker system 104 and the second ranker system 106 based upon the search preference judgments of the set of search queries and the search result list pairs as manually judged (e.g., received via the feedback component 122). Further, the comparison of the performances of the first ranker system 104 and the second ranker system 106 effectuated by the score component 124 can also be based upon at least a subset of the search queries and search result list pairs excluded from the first set of search queries and search result pairs that are outputted for manual judging of the search preference judgments. Thus, predicted search preference judgments of at least a portion of the search queries and the search result list pairs included in the second set can be used by the score component 124 to compare the performances of the ranker systems 104-106.

The techniques set forth herein differ from conventional approaches that rely on query document relevance, preference judgments for IR evaluation, or search satisfaction prediction. For instance, while query document relevance may be a signal for evaluating Web search ranker systems, query document judgments may fail to consider the interaction between results as part of a judging criteria. Thus, the approaches set forth herein differ from traditional approaches, in that the search preference evaluation system 102 (e.g., the prediction component 114) predicts user preference at a result list level as opposed to a document level. Information about result lists can highlight insights as to how users compare search result lists. Moreover, while pairwise preference judgments for IR evaluation have become more prevalent, such conventional approaches can be used to evaluate search systems based on correlation between preference judgment and traditional relevance measures. However, such conventional approaches typically fail to automatically predict preference judgments using various signals as described herein. Moreover, the approaches set forth herein differ from conventional approaches that attempt to evaluate search satisfaction. With the search preference evaluation system 102, search satisfaction is not directly measured; rather, sets of search results can be compared based on automatic prediction of which set is more likely to be preferred by users.

The search preference evaluation system 102 can provide a machine-assisted evaluation framework that can leverage the classifier(s) 116 to reduce time and cost of annotations while mitigating loss in evaluation accuracy.

Figure 2:
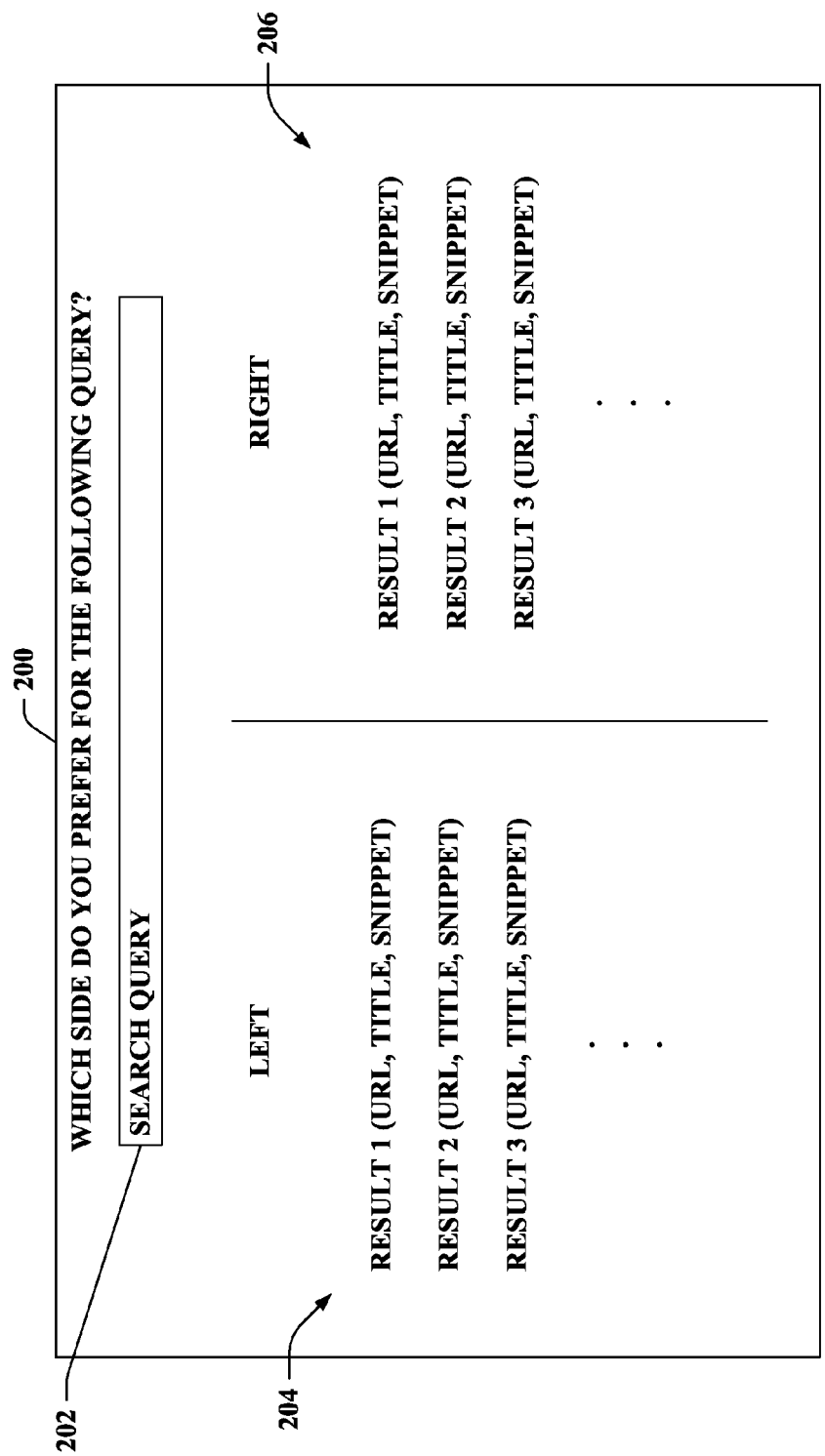
FIG. 2 illustrates an exemplary user interface for manual evaluation of a side-by-side search preference judgment for an exemplary search query.

Now turning to FIG. 2, illustrated is an exemplary user interface 200 for manual evaluation of a side-by-side search preference judgment for an exemplary search query. The user interface 200 can be displayed on a display screen of an annotator computing device (e.g., one of the annotator computing device(s) 120). The search query can be entered into a search query field 202 of the user interface 200. The user interface 200 includes a first search result list 204 and a second search result list 206 returned by differing ranker systems responsive to the search query entered in the search query field 202. The user interface 200 can be employed to cause a judge to examine documents, titles, snippets, etc. to assign preference between the search result lists returned by the differing ranker systems.

The user interface 200 displays the search result list 204 and the search result list 206 in a side-by-side setting for each search query. Thus, the results returned by the two ranker systems are shown side-by-side to a judge, with the search result list 204 on a left side and the search result list 206 on a right side. In the example set forth in FIG. 2, the search result list 204 and the search result list 206 are adjacent. Each search result list, for example, can include a first 10 search results respectively returned by the ranker systems, except where the ranker systems return fewer than 10 results for a given search query. However, as noted above, the claimed subject matter is not limited to the search result lists including a maximum of 10 search results (e.g., N can be substantially any other integer). Moreover, it is contemplated other subsets of the search results returned by the ranker system(s) can be included in the search result list(s) (e.g., the search result list 204 can include a first 10 search results and the search result list 206 can include a second 10 search results, etc.).

The URLs, titles, and snippets of each search result in the search result lists 204 and 206 can be included in the user interface 200. Moreover, the order in which the search result lists from the ranker systems are assigned to sides (e.g., left or right) can be randomized. As part of a manual judging of the search result lists returned by the differing ranker systems, judges can be asked to examine the two sides and submit a preference judgment. According to an example, preference judgments can be collected on a seven-point scale, where points range from a strong preference to the left side, to the midpoint reflecting no preference between the two sides, to the last point reflecting a strong preference to the right side. The seven points can be left much better, left better, left slightly better, about the same, right slightly better, right better, and right much better. However, it is contemplated that other scales are intended to fall within the scope of the hereto appended claims.

Again, reference is made to FIG. 1. As noted above, the feature extraction component 112 can extract values of features of the search query 108, the first search result list, and the second search result list. Moreover, the prediction component 114 can generate a predicted search preference judgment by employing the classifier(s) 116. The classifier(s) 116 predict the search preference judgment based upon the values of the features of the search query 108, the search result list, and the second search result.

The features can include query features, relevance features, click-based features, features of titles, features of snippets, diversity features, and so forth. Various features can describe the two search result lists and differences between the search result lists. Many features are described in the following examples. It is to be appreciated that a combination of such features can be utilized by the search preference evaluation system 102. Moreover, additional features other than the features disclosed herein can be utilized by the search preference evaluation system 102 and/or features set forth below need not be employed by the search preference evaluation system 102.

As noted above, the features can include query features. Search queries can have various characteristics which may affect user perception of preference. For example, users may value diversity more than other dimensions for a particular group of queries. For another group of queries, relevance may be more important. To capture these variations in preference dimensions, a list of features can be used to describe the query of interest. Below are examples of query features that can be analyzed by the feature extraction component 112.

Query Length: Query length features are features of the query string itself, and can include a number of characters and number of tokens in the query.

Query Type: Query type feature can pertain to whether the query is a navigational query or informational query. Navigational queries can be used to reach a particular site, while informational queries can be used to acquire some information. Hence, users submitting a navigational query are likely interested in finding a particular site on topic of the search results, where users submitting informational queries may be interested in multiple relevant results with useful information.

Query Topic: Queries can also be categorized into different topical categories. Topical categories can allow the classifier(s) 116 to handle signals differently for different topics. For example, in a news query, freshness may likely be more important than in queries with different topics. To assign topical categories to queries, the Open Directory Project (ODP) can be used. The ODP uses a hierarchical scheme for organizing URLs into categories and subcategories. ODP categories can be assigned to queries based on ODP categories of URLs that have been clicked or returned for such query. Queries belonging to multiple topical categories can be permitted by defining a topic distribution over classes rather than assigning every query to a single category. The foregoing may be useful when result documents can have multiple aspects.

Query History: Historic features of queries, such as query frequency in logs of a commercial search engine and an average result clickthrough rate (CTR) for the query can be used. A result clickthrough rate can be a number of times a result has been clicked divided by total number of impressions. The clickthrough rate can be calculated for clicks with dwell times larger than a threshold length of time (e.g., 30 seconds), referred to as long CTR, which can be correlated with satisfaction. The signals can be used as a proxy for query popularity and query difficulty.

Moreover, as noted above, the features can include relevance features. For instance, standard relevance judgments can be on a five-point scale with values (perfect, excellent, good, fair, bad) used for query-document pairs to derive a set of relevance features. The following are examples of relevance features that can be evaluated by the feature extraction component 112.

Relevance@N: The relevance of every URL at positions 1 through 10 as well as differences in relevance between the search result lists in the pair.

Precision@N: The precision can be a fraction of documents in the result list that are relevant to the query. Relevant documents are documents with a relevance rating of perfect, excellent, or good. Precisions at 1, 3, 5 and 10 for both sides, as well as deltas between them, can be computed.

DCG@N: Discounted Cumulative Gain (DCG) can be a position-weighted mean of the relevance of a document. Given relevance judgments on a five-point scale, DCG can be computed as follows:

$$DCG@N = rel_1 + \sum_{i=2}^{N} \frac{rel_i}{\log_2(i)}$$

In the foregoing, N is a particular rank position. DCG can incorporate results to arbitrary ranks, though DCG at ranks 1, 3, 5 and 10 may commonly be used. DCG at 1, 3, 5 and 10 can be computed at both sides as well as deltas between them.

NDCP@N: Normalized DCG (NDCG) can be a normalized form of DCG that can be computed by dividing DCG by an ideal DCG (IDCG). The ideal DCG can be obtained by sorting documents of a result list by relevance and computing the DCG. Hence, IDCG can be a maximum possible DCG for a query and a result list. Like DCG, NDCG can be computed at 1, 3, 5 and 10 for both sides.

Best@N: The relevance label of the best document for every list at different positions can be computed (e.g., label of the best document in the top N results). Further, this value can be used for both sides as features.

Worst@N: Similar to Best@N, the relevance label of the worst document for every list at different positions can be computed. This value can be used for both sides as features.

Perfect/Excellent/Bad ratio: The existence of very good or very bad results on a search result page can affect user perception of the page quality, which can affect the user's preference judgment. To capture such behavior, a percentage of results with perfect, excellent, or bad labels can be used as features.

In the foregoing, "@N" can denote that the metrics are evaluated on top N documents. The value of metrics can be computed for both the left side and right side, as well as delta between the left and right sides.

Further, the features evaluated by the feature extraction component 112 can include clicked-based features. Click information can be used to derive a relevance signal. Click dwell time (e.g., time spent on a landing page before returning to the search engine) can be correlated with satisfaction. For instance, clicks with dwell times exceeding 30 seconds (e.g., a threshold length of time) can be correlated with satisfaction. Accordingly, click data can be used to build features that can be used instead of, or in addition to, features computed from relevance judgments.

Click-based relevance judgments can be obtained using a log-based technique; thus, relevance judgments for query document pairs can be inferred from search result clicks. Three types of clicks can be considered in labeling user feedback in the logs; long clicks, short clicks and no clicks. A long click can be defined as either a click with dwell time of 30 seconds or more or a last result click in a session. Clicks with dwell times shorter than 30 seconds can be considered short clicks.

According to an example, one of three rating labels can be assigned to each query document pairs in each impression. If a document received at least one long click, it can be labeled as a 2. If a document received only short clicks, it can be labeled with a 1. If a document was not clicked at all, it can be labeled with a 0. The foregoing can provide a three-level judgment for each query document pair and each impression. To assign a single value for query document pairs with multiple impressions, a median of impressions can be computed. Relevance features described above can further be recomputed using the three-point scale inferred from the click data. A label of 2 can denote a perfect result, while a label of 0 can denote a bad result. Additionally, the clickthrough rate (CTR), number of times a result has been clicked divided by the total number of its impressions, and the long clickthrough rates (long CTR), considering only clicks with dwell times of 30 seconds or more, for each query document pairs can be considered as features.

Further, the features can also include title and/or snippet features. Search engines can display several pieces of information for each search result. The pieces of information can include the URL of the webpage, the title of the webpage, and a snippet from the webpage. The snippet is a brief summary that describes the content of the webpage. Snippets commonly can be extracted from the webpage itself, but may also be taken from other sources, such as Web directories. The URL, title, and snippet can vary across results. For example, some results may not have a snippet, others may have longer/shorter snippets compared to other results, etc. Moreover, some terms in the URL, title, and snippet can be bolded while others are not. Further, a number of bolded terms can vary across results. The number of terms that match the query terms can also vary. Below are various examples of title and/or snippet features that can be evaluated by the feature extraction component 112.

Highlighted Terms: Highlighted terms in titles and snippets can affect user behavior by drawing attention of a user to specific results. A number of highlighted terms in each result, as well as a minimum, maximum, and average number of highlighted terms for the result list, can be used as features. Such values can be computed for the URL, the title, and the snippet. The highlighted terms need not appear in the query because search systems sometimes highlight terms that may be relevant to the query even if not a query term.

Text Length: Length of the titles and the snippets in terms of number of characters and number of words can also be used as features. Result level and list level (minimum, maximum and average) can be used like other features.

Readability Level: Title and caption readability levels can be used as a signal to predict search result quality. Readability of text can be assessed using a vocabulary-based technique. For instance, the Dale-Chall readability measure that computes a fraction of unknown words in text relative to the Dale word list can be used. This feature can be computed for the titles and snippets of results. The average, minimum, and maximum values can be used to assess readability level of the result list.

Term Match: Features that characterize the relation between the query and the URL, title, and snippet of results can also be used. For instance, standard normalization can be performed, where letters are replaced with corresponding lowercase representation. Further, runs of whitespace characters can be replaced with a single space, and leading or trailing spaces can be removed. Text normalization can be applied to queries, URLs, titles, and snippets. In addition to the standard normalization, queries that do not respect word boundaries can be broken into words. Word breaking can be useful for natural language processing applications, which can be a problem with queries when users do not observe the cracked word boundaries (e.g., "southjerseyhighschoolbaseball" for "south jersey high school baseball") or when users are searching for a part of the URL (e.g., "quincycollege" for "quincy college"). For instance, word breaking can be applied to queries and URLs.

Following text normalization and word breaking, stop words can be removed from text and a number of query terms that exist in the URL, title, or snippet of each result can be computed. Term matching can be performed in various manners. For instance, exact match or approximate match can be determined. Exact match can be when two terms are identical. The objective of approximate match can be to capture spelling variance and misspellings. For instance, this can be performed by allowing two terms to match if the Levenshtein edit distance between such words is less than two.

Phrase Match: In addition to matching terms, phrases can be matched. For example, for the query "new york weather", a snippet with the phrase "new york" can be rewarded, while another snippet with the phrase "new mexico" is not rewarded just because it includes the term "new".

For phrase matching, each query can be segmented into phrases. Query segmentation can include taking a user's search query and dividing the tokens into individual phrases or semantic units. Queries, URLs, titles, and snippets can be segmented into phrases by computing point-wise mutual information scores for each pair of consecutive words. A segment break can be introduced whenever the point wise mutual information between two consecutive words drops below a certain threshold $\tau$. The threshold, for instance, can be $\tau=0.895$; such threshold can be selected to maximize break accuracy on the Bergsma-Wang-Corpus. Like term matching, the phrase match can be computed between the query and the URL, title, and snippet for each result. Likewise, exact matching and approximate matching can be used as described above for term matching features. Features to describe each result, as well as a minimum, maximum, and average over the search result list, can be used.

Further, as noted above, the features can include diversity features. Evaluation techniques that use a query document pair as the unit of the evaluation can focus on query document relevance because. However, when evaluating a result list that includes multiple documents, other aspects can be taken into consideration, such as diversity. Diversity a result list can be assessed by the feature extraction component 112 to obtain values of one or more of the following features.

Domain Diversity: A distribution of domain names of results in the list can be built. To assess diversity, the domain distribution, richness, and entropy can be assessed. Richness can quantify how many different types (e.g., domains) exist in the data set. For example, if the 10 results belong to 10 different domains, the richness can be 10, while if two results among the 10 belong to the same domain, the richness can be 9. A second measure can be a Shannon entropy of the domain distribution. Entropy can quantify uncertainty of information content. Accordingly, the more different types there are, the more equal their probability and the more difficult it may be to predict an unseen one. Entropy can often be computed as follows:

$$H = -\Sigma_{i=1}^{n} p_i \ln p_i$$

In the foregoing, where $p_i$ is a proportion of results belonging to the $i^{th}$ domain and n is a number of unique domains in a data set.

ODP Diversity: Similar to domain diversity, richness and entropy with respect to the distributions of results ODP categories can be computed. Automatic classification of URLs into ODP categories can be performed. URLs in the directory can be correctly classified, while missing URLs can be incrementally pruned, one level at a time, until a match is found or is declared as a miss. The first three levels of the ODP hierarchy can be used to represent each URL (e.g., Recreation: Travel: Transportation).

Text Diversity: The domain and ODP diversity features can attempt to predict and assign the page topicality, and can be used to assess diversity. Diversity estimation can also be assessed by looking at similarity between the text of the title and snippet of each result to estimate text diversity. The Jaccard coefficient and cosine similarity can be used. To compute the Jaccard coefficient, each result can be represented as a set of terms that occurred in its title and snippet after removing stop words. The Jaccard coefficient between each pair of results can be computed as follows:

$$J(A, B) = \frac{|A \cap B|}{|A \cup B|}$$

In the foregoing, A and B are sets of terms in the two results. This value can be computed for pairs and then the average can be computed. Additionally, the cosine similarity can be computed between text representations of results. Using the terms in the title and snippet, each result can be represented as a T-dimensional vector, where T is a number of unique terms across results. Similarity between two vectors can be estimated by computing the cosine of the angle between the two vectors. The average similarity over pairs can then be computed and used as a proxy for result list diversity.

Figure 3:
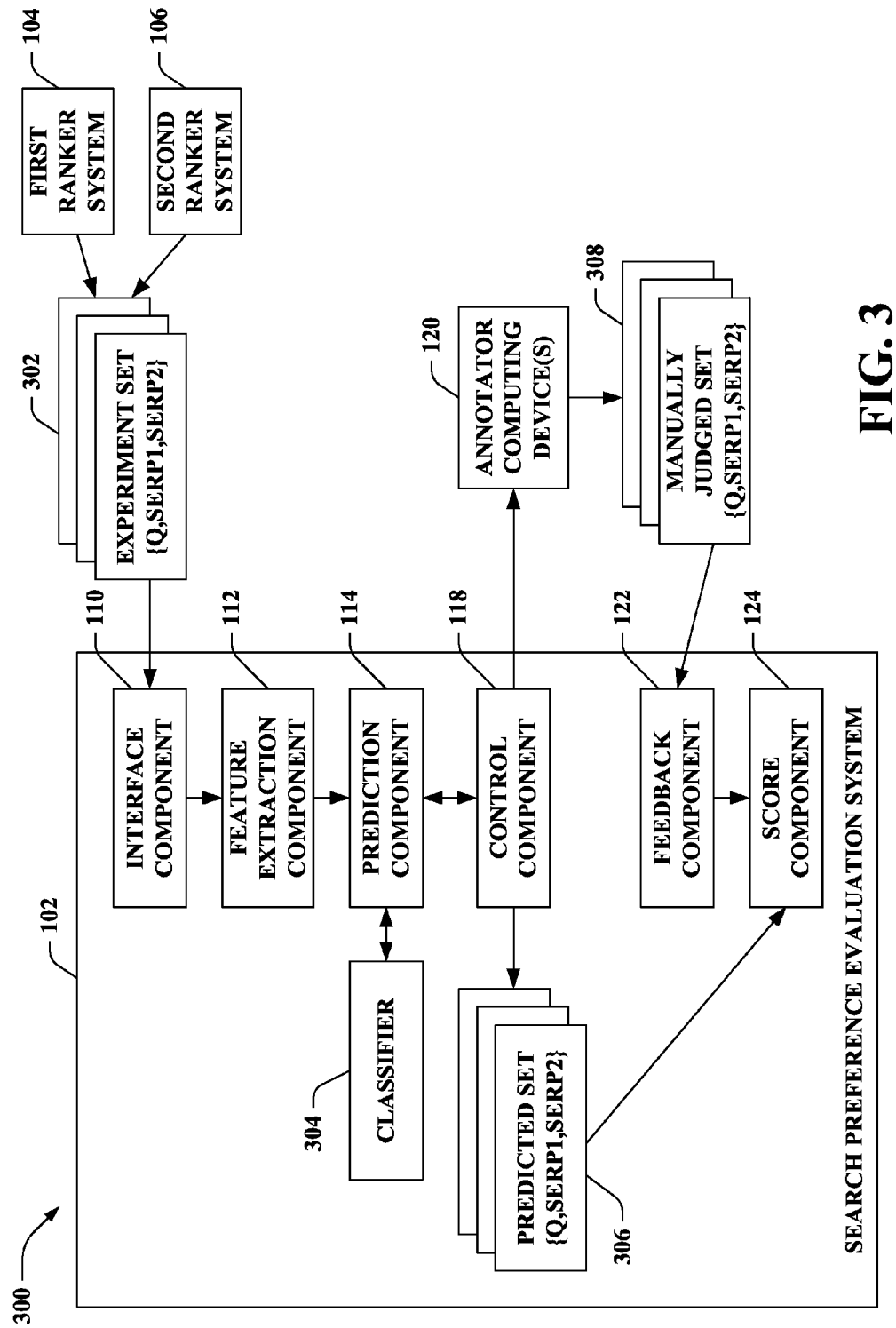
FIG. 3 illustrates a functional block diagram of an exemplary system that inhibits search queries having corresponding search result list pairs that lack quality differences from being manually judged for search preference judgments.

Turning to FIG. 3, illustrated is a system 300 that inhibits search queries having corresponding search result list pairs that lack quality differences from being manually judged for search preference judgments. Similar to above, the system 300 includes the search preference evaluation system 102, the first ranker system 104, the second ranker system 106, and the annotator computing device(s) 120.

Search queries (Qs) and corresponding search result list pairs (e.g., search engine result pages (SERPs)) respectively returned by the ranker systems 104-106 for each of the search queries included in an experiment set 302 can be provided to the search preference evaluation system 102. Thus, a search query (Q), a first search result list (SERP1) returned by the first ranker system 104 responsive to the search query (Q), and a second search result list (SERP2) returned by the second ranker system 106 responsive to the search query (Q) for each of the search queries in the experiment set 302 can be received by the interface component 110 of the search preference evaluation system 102. Further, the feature extraction component 112 can extract values of features of the search queries and the corresponding search result list pairs in the experiment set 302.

The below example describes a search query and the corresponding search result list pair (the first search result list and the second search result list) from the experiment set 302. It is contemplated such example can be extended to the other search queries and corresponding search result list pairs in the experiment set 302.

The prediction component 114 can employ a classifier 304 to predict whether a search preference judgment of the first search result list and the second search result list for the search query indicates a quality difference between the first search result list and the second search result list. The classifier 304 predicts whether the search preference judgment indicates the quality difference based upon the values of the features of the search query, the search result list, and the second search result list.

The classifier 304 can be a binary classifier (e.g., no preference versus preference), which can utilize the features described herein (or a subset thereof and/or additional features). For instance, the classifier 304 can employ various learning functions such as logistic regression, support vector machines, random forests, gradient boosted decision trees, or the like. Accordingly, the prediction component 114, when employing the classifier 304, can evaluate the search query and the corresponding search result list pair to determine if there is a quality difference as part of the predicted search preference judgment. Likewise, the other search queries and corresponding search result list pairs in the experiment set 302 can similarly be evaluated for predicted quality differences using the classifier 304.

The control component 118 can exclude the search query, the first search result list, and the second search result list from a first set of search queries and search result list pairs to be manually judged for search preference judgments when the first search result list and the second search result list for the search query are predicted by the prediction component 114 to lack the quality difference. Accordingly, when predicted to lack the quality difference, the control component 118 can insert the search query, the first search result list, and the second search result list in a second set of search queries and search result list pairs (e.g., a predicted set 306), which can be inhibited from being outputted to the annotator computing device(s) 120. Alternatively, in accordance with the embodiment of FIG. 3, the control component 118 can insert the search query, the first search result list, and the second search result list in the first set of search queries and search result list pairs to be manually judged for search preference judgments when the first search result list and the second search result list for the search query are predicted by the prediction component 114 to have the quality difference.

Moreover, the control component 118 can output, to the annotator computing device(s) 120, the first set of the search queries and the search result list pairs for manual judging of the search preference judgments. Accordingly, a manually judged set 308 can be generated by judge(s) employing the annotator computing device(s) 120. The manually judged set 308 can include manually judged search preference judgments of at least a portion of the first set of the search queries and the search result list pairs.

The feedback component 122 can receive the manually judged set 308. Further, the score component 124 can compare performances of the first ranker system 104 and the second ranker system 106 based upon the search preference judgments of the first set of search queries and the search result list pairs as manually judged by the judges employing the annotator computing device(s) 120 (e.g., the manually judged set 308).

The score component 124 can compare the ranker systems 104-106 utilizing a win/loss measure. For instance, the first ranker system 104 can be referred to as A and the second ranker system 106 can be referred to as B. The score component 124 can measure a number of times the first ranker system 104 (A) is preferred over the second ranker system 106 (B) minus a total a number of times the second ranker system 106 (B) is preferred over the first ranker system 104 (A), divided by a total number of instances as follows:

$$WinLoss(A, B) = \frac{\#wins - \#losses}{\text{Total number of instances}}$$

The classifier 304 can be employed to determine whether there is a quality difference between two search result lists for a given search query. Search queries where no preference is reported between the ranker systems 104-106 can fail to contribute to the outcome of the comparison performed by the score component 124, although they may consume significant amounts of annotation costs in terms of time, cost, etc. Thus, the search preference evaluation system 102 can utilize the classifier 304 to reduce judgment time and cost by automatically identifying search result list pairs that have similar quality and inhibiting such identified search result list pairs from being manually judged.

Further, the control component 118 can prioritize search queries in terms of which search queries should be sent to judges and which ones should not. For instance, a significant percentage of search queries can have search result list pairs from the ranker systems 104-106 that are substantially similar (e.g., lack the difference in quality). These queries typically do not contribute to the evaluation outcome generated by the score component 124, and thus, can be ignored, thereby enabling judges to focus attention on other search queries where the search result lists from the ranker systems 104-106 are likely to be different.

Figure 4:
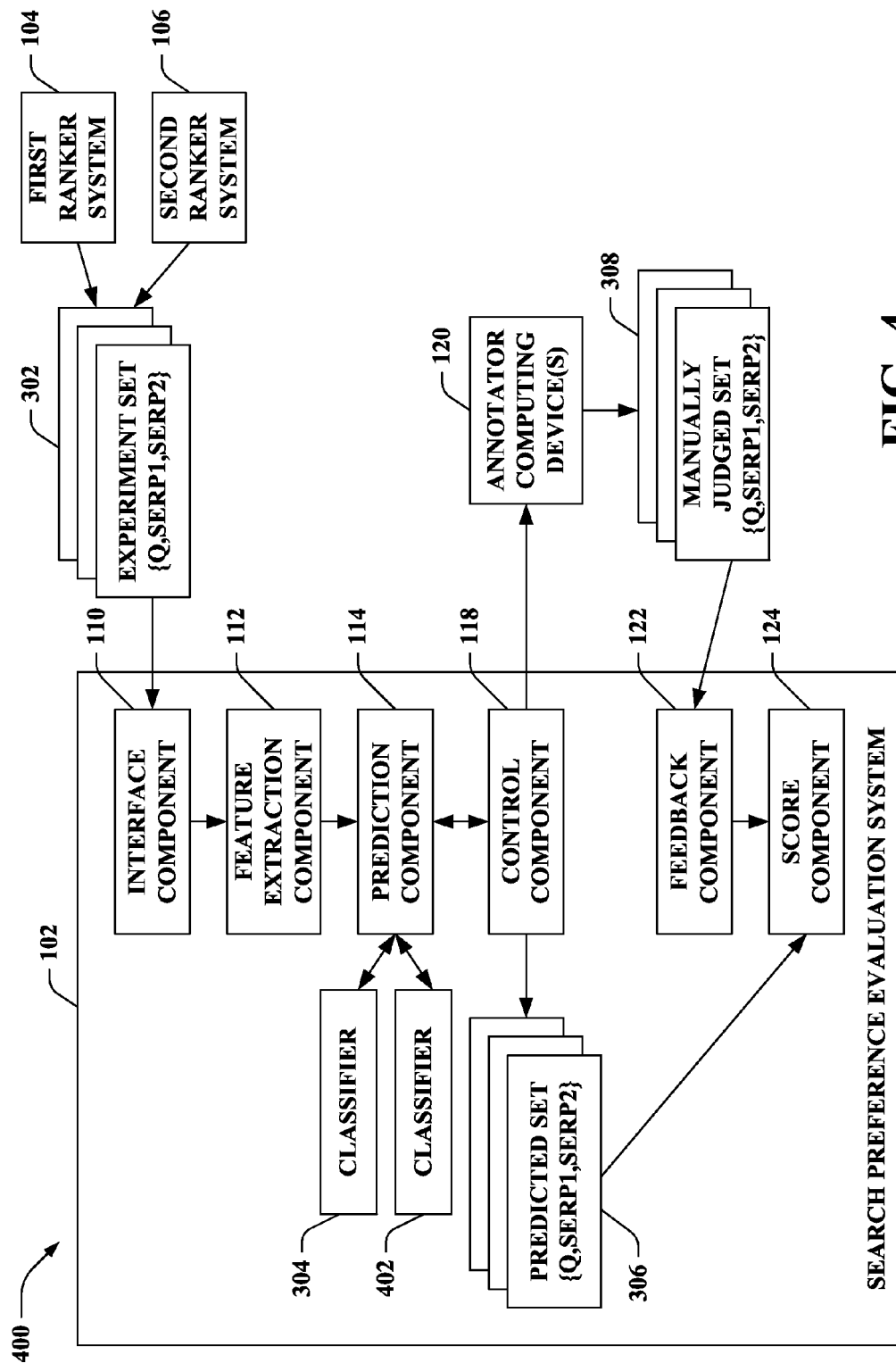
FIG. 4 illustrates a functional block diagram of an exemplary system that inhibits a subset of search queries and corresponding search result list pairs in an experiment set from being manually judged for search preference judgments.

Now turning to FIG. 4, illustrated is a system 400 that inhibits a subset of the search queries and corresponding search result list pairs in the experiment set 302 from being manually judged for search preference judgments. In the system 400, samples judged as different with confidence levels above a threshold level can be discarded from manual judgment; rather, model-based judgment can be used for such samples. Again, the system 400 includes the search preference evaluation system 102, the first ranker system 104, the second ranker system 106, and the annotator computing device(s) 120. Moreover, similar to above, the interface component 110 receives the experiment set 302, and the feature extraction component 112 can extract the values of the features of the search queries and corresponding search result list pairs in the experiment set 302.

An example describing a search query and a corresponding search result list pair from the experiment set 302 is again described. It is to be appreciated that such example can be extended to the other search queries and corresponding search result list pairs in the experiment set 302.

Similar to the system 300 of FIG. 3, the prediction component 114 can employ the classifier 304 to predict whether the search preference judgment of the first search result list and the second search result list for the search query indicates a quality difference between the first search result list and the second search result list. The control component 118 can exclude the search query, the first search result list, and the second search result list from the first set of search queries and search result list pairs to be manually judged for search preference judgments when the first search result list and the second search result list for the search query are predicted to lack the quality difference. Rather, when predicted to lack the quality difference, the control component 118 can insert the search query, the first search result list, and the second search result list in the second set of search queries and search result list pairs (e.g., the predicted set 306), which can be inhibited from being outputted to the annotator computing device(s) 120.

In the embodiment of FIG. 4, the search preference evaluation system 102 includes a second classifier 402. The prediction component 114 can employ the classifier 402 when the first search result list and the second search result list are predicted to have the quality difference. More particularly, when the prediction component 114 (e.g., utilizing the classifier 304) predicts that the first search result list and the second search result list for the search query have the quality difference, then the prediction component 114 can employ the second classifier 402 to predict whether the search preference judgment indicates the first search result list or the second search result list is preferred for the search query. The second classifier 402 can predict whether the search preference judgment indicates the first search result list or the second search result list is preferred based upon the values of the features of the search query, the first search result list, and the second search result list. Further, the prediction component 114 can determine a confidence level for whether the search preference judgment indicates the first search result list or the second search result list is preferred as predicted.

The classifier 402 can be a binary classifier trained to predict which search result list is better (e.g., predict whether left side versus right side of a side-by-side presentation is better). The classifier 402, for instance, can be a gradient-boosted decision tree algorithm or can employ other learning algorithms such as logistic regression, support vector machines, random forests, or the like.

The control component 118 can exclude the search query, the first search result list, and the second search result list from the first set of the search queries and the search result list pairs to be manually judged for the search preference judgments when the confidence level is above a threshold value. Further, the control component 118 can insert the search query, the first search result list, and the second search result list in the second set of search queries and search result list pairs (e.g., the predicted set 306) when the confidence level is above the threshold value. The search queries and the search result list pairs in the second set can be labeled by the control component 118 with the preferences between search result lists as predicted by the second classifier 402 (e.g., the predicted preferences have respective confidence levels above the threshold value). Thus, the control component 118 can employ the prediction generated by the prediction component 114 utilizing the classifier 402 to automatically label a subset of the search result list pairs. The prediction component 114 can utilize the classifier 402 to predict which side is better; whenever the classifier 402 makes such a prediction with high confidence, the control component 118 can abstain from sending this instance to the annotator computing device(s) 120 (e.g., the judges), and instead use the predicted value.

Alternatively, when the confidence level is equal to or below the threshold level, the control component 118 can insert the search query, the first search result list, and the second search result list in the first set of the search queries and the search result list pairs to be manually judged for the search preference judgments. The control component 118 can output the first set of the search queries and search result list pairs for manual judging of the search preference judgments to the annotator computing device(s) 120.

Similar to above, the feedback component 122 can receive the search preference judgments of at least a portion of the first set of the search queries and the search result list pairs as manually judged (e.g., by the judge(s) employing the annotator computing device(s) 120, the manually judged set 308). Further, the score component 124 can compare performances of the first ranker system 104 and the second ranker system 106 based upon the search preference judgments of the first set of the search queries and the search result list pairs as manually judged (e.g., the manually judged set 308) and the preferences between the search result list in the second set as labeled (e.g., the predicted set 306).

In the embodiment shown in FIG. 4, the classifier 304 and the classifier 402 are described as being separate classifiers. In other embodiments, however, it is contemplated that the classifier 304 and the classifier 402 can be the same classifier (e.g., the second classifier 402 can be the first classifier 304).

Search result list preference judgments can be utilized to compare different ranker systems 104-106. Even though preference judgment at the result level can produce more accurate results, it may lead to higher annotation costs. As set forth herein, user preference judgments can be predicted using various signals, including query document relevance, click-based features, title and snippet features, diversity features, and so forth. Accordingly, the techniques set forth herein can be utilized to provide a machine-assisted evaluation framework where prediction models can be used to assist human judges. The proposed techniques can be used to reduce time and cost of collecting preference judgments by automatically identifying preferred sides or by automatically discarding queries where performance of the two ranker systems 104-106 are similar.

The system 400 can reduce judgment time and cost by identifying search result list pairs that have similar quality and search result lists that are likely to be preferred with a confidence above the threshold value. Further, the system 400 can combine machine learning and judge labels to produce search preference judgments with less cost and in a reduced amount of time.

Figure 5:
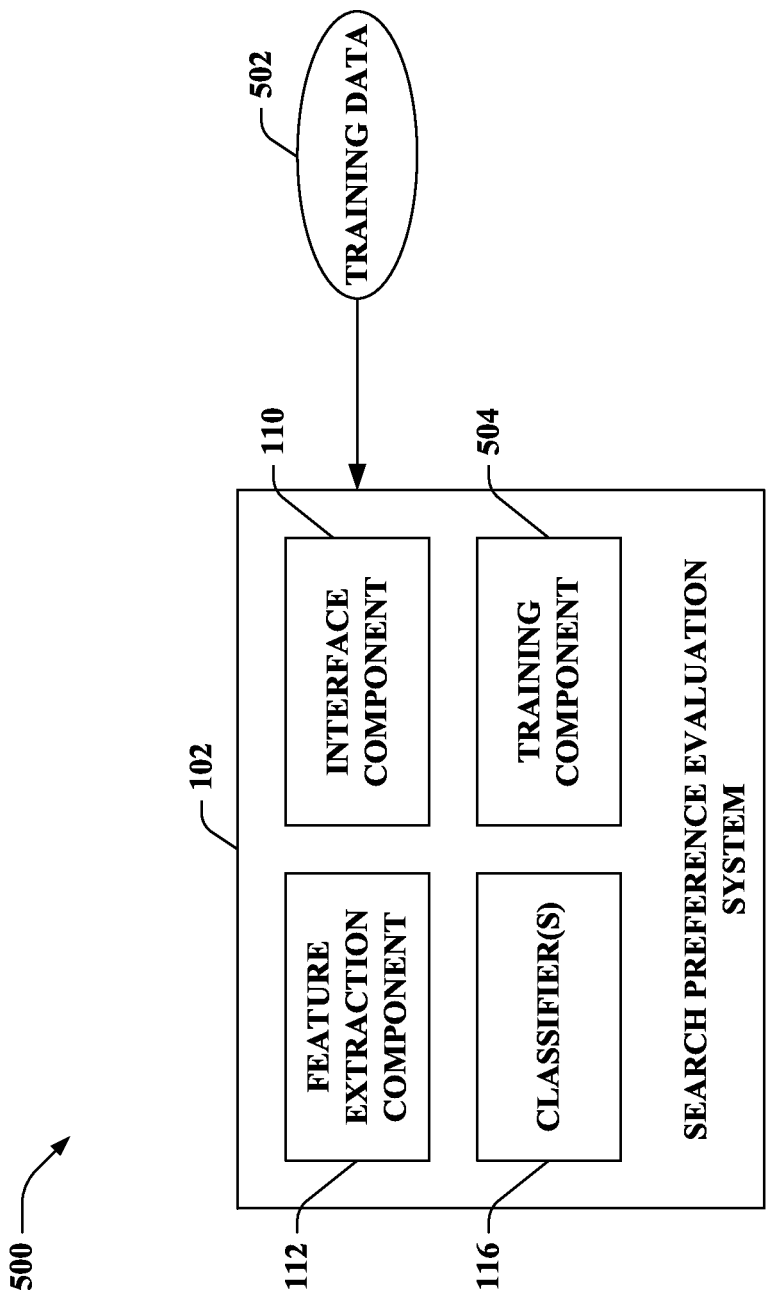
FIG. 5 illustrates a functional block diagram of an exemplary system that trains classifier(s) used to predict search preference judgments.

Now turning to FIG. 5, illustrated is a system 500 that trains the classifier(s) 116 used to predict search preference judgments. The system 500 includes the search preference evaluation system 102. Again, the search preference evaluation system 102 can include the interface component 110, the feature extraction component 112, and the classifier(s) 116.

The interface component 110 can receive training data 502. The training data 502, for instance, can include a set of search queries and search result list pairs, where the search result lists in the search result list pairs are respectively returned by a first ranker system (e.g., the first ranker system 104) and a second ranker system (e.g., the second ranker system 106) responsive to the search queries. Moreover, the training data 502 can include manually judged search preference judgments (e.g., manually judged side-by-side search preference judgments, etc.) of the set of the search queries and the search result list pairs.

The feature extraction component 112 can determine values of features of the search queries and the search result list pairs in the training data 502. Moreover, the search preference evaluation system 102 can include a training component 504 that trains the classifier(s) 116 based upon the manually judged search preference judgments of the set of the search queries and the search result list pairs and the values of the features of the search queries and the search result list pairs. The classifier(s) 116 can be trained to generate predicted search preference judgments. According to various examples set forth herein, the classifier 304 and/or the classifier 402 can be trained by the training component 504 based upon the training data 502.

Figure 6:
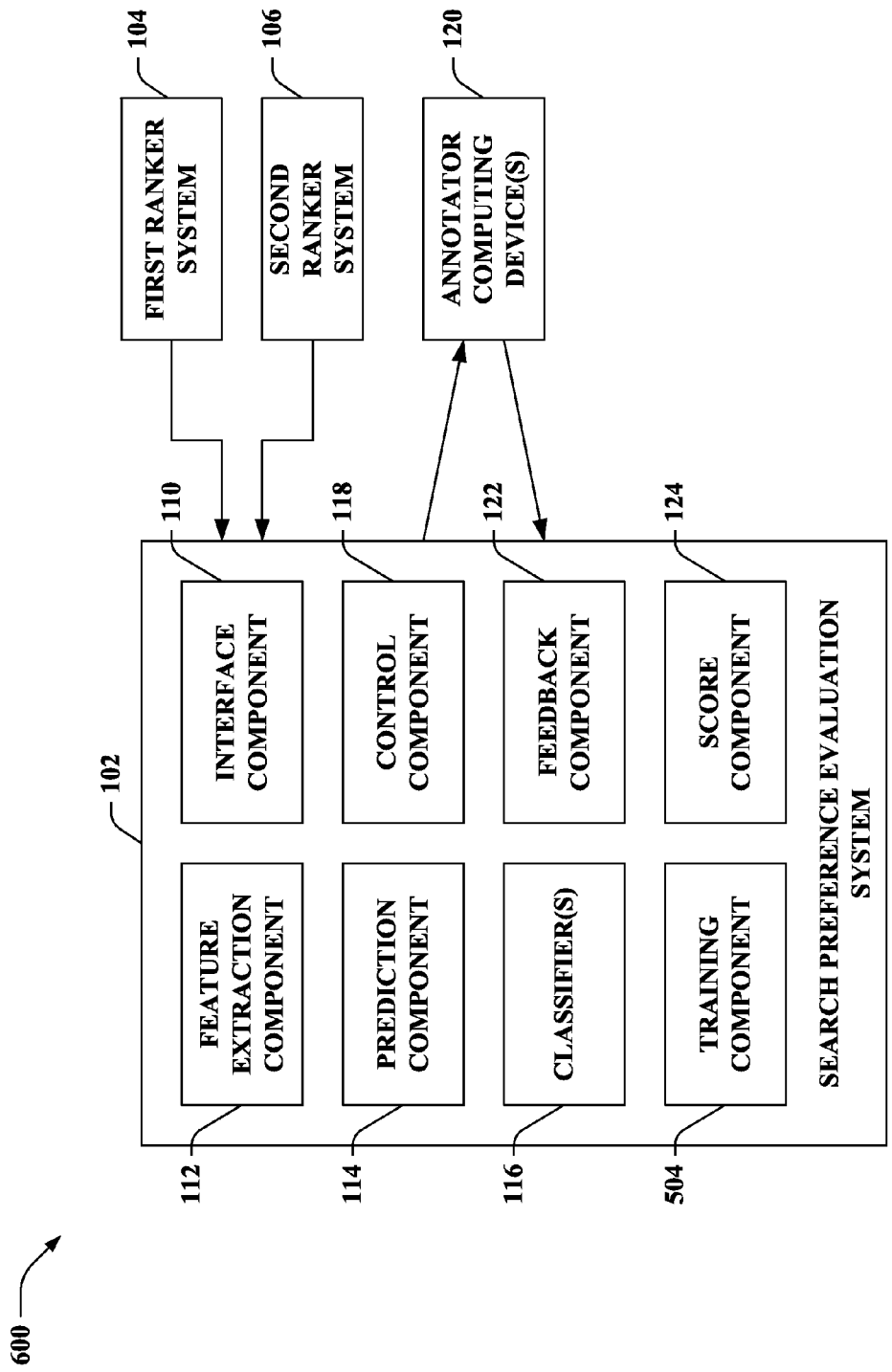
FIG. 6 illustrates a functional block diagram of an exemplary system that retrains the classifier(s) used to predict search preference judgments.

With reference to FIG. 6, illustrated is a system 600 that retrains the classifier(s) 116 used to predict search preference judgments. Similar to above, the system 600 includes the search preference evaluation system 102, the ranker systems 104-106, and the annotator computing device(s) 120. The search preference evaluation system 102 can include the interface component 110, the feature extraction component 112, the prediction component 114, the classifier(s) 116 (e.g., the classifier 304 and/or the classifier 402), the control component 118, the feedback component 122, and the score component 124. Moreover, the search preference evaluation system 102 can include the training component 504. Accordingly, the feedback component 122 can receive search preference judgments of at least the portion of a set of search queries and search result list pairs as manually judged by judge(s) employing the annotator computing device(s) 120. Further, the training component 504 can retrain the classifier(s) 116 based upon the search preference judgments of the set of the search queries and the search result list pairs as manually judged. Thus, the retrained classifier(s) 116 can be employed by the prediction component 114 to generate predicted search preference judgments for subsequently received search result list pairs for corresponding search queries.

Figure 7:
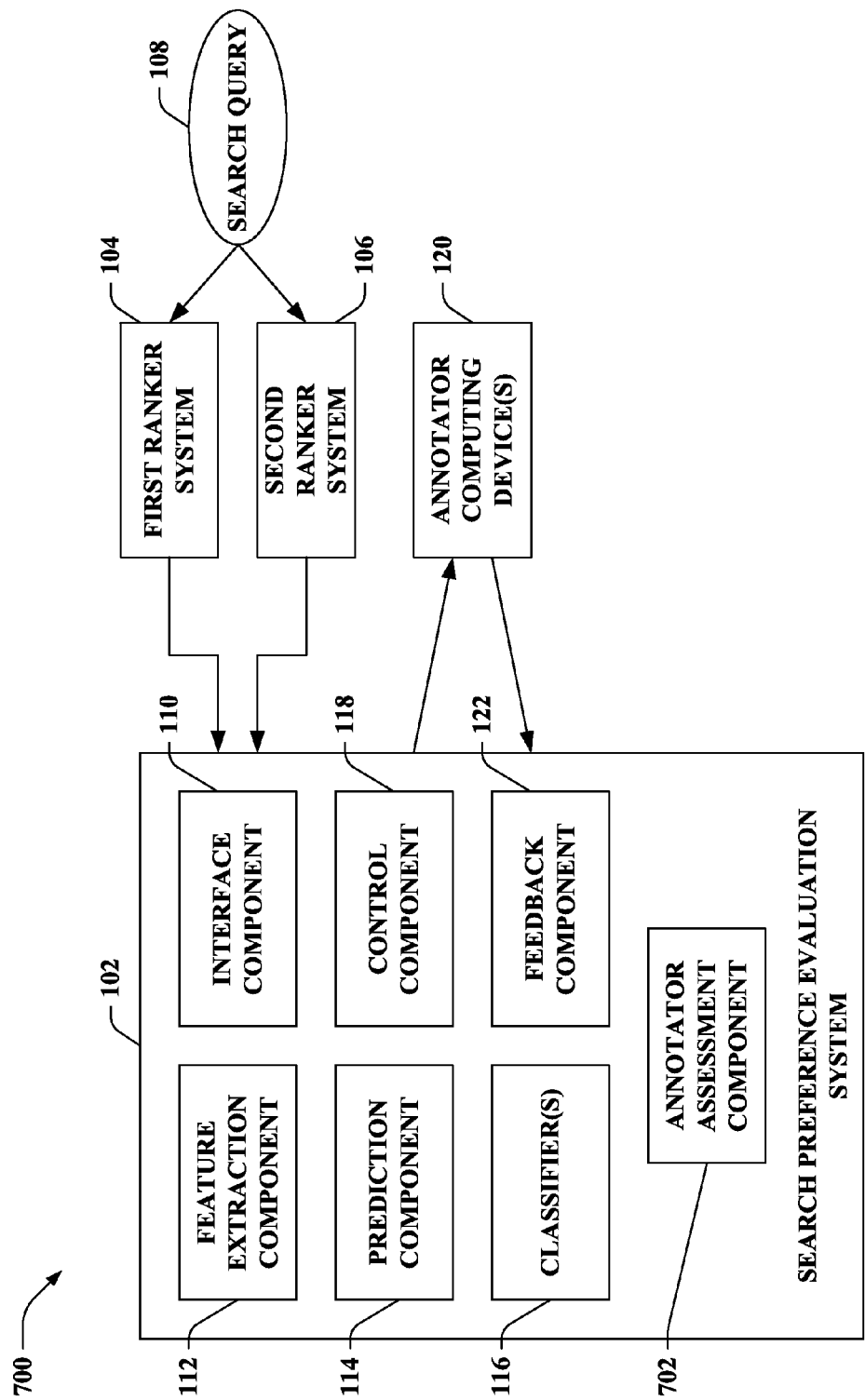
FIG. 7 illustrates a functional block diagram of an exemplary system that tracks performance of judges that manually judge search preference judgments.

Turning to FIG. 7, illustrated is a system 700 that tracks performance of judges that manually judge search preference judgments. The system 700 can use automatic predictions to control spammers, as well as to monitor less trained judges for judgment quality. The system 700 can identify when a judge disagrees with predictions on search preference judgments that are predicted with high confidence. Accordingly, a second judge can check the manual judgment of the judge, which can be utilized to detect whether the judge is a spammer or is not trained enough for the task.

The system 700 includes the search preference evaluation system 102, which (similar to above) can further include the interface component 110, the feature extraction component 112, the prediction component 114, the classifier(s) 116, the control component 118, and the feedback component 122. While not depicted, it is contemplated that the search preference evaluation system 102 of FIG. 7 can further include the score component 124. Similar to above, the prediction component 114 can utilize the classifier(s) 116 to generate a prediction of a search preference judgment of a first search result list returned by the first ranker system 104 responsive to the search query 108 and a second search result list returned by the second ranker system 106 responsive to the search query 108. Further, the control component 118 can present the search query 108, the first search result list, and the second search result list to the annotator computing device(s) 120 as part of a set to be manually judged for search preference judgments. The feedback component 122 can receive the search preference judgment of the first search result list and the second search result list for the search query 108 as manually judged by a judge employing one of more of the annotator computing device(s) 120.

The search preference evaluation system 102 can further include an annotator assessment component 702 that performs a comparison between the search preference judgment of the first search result list and the second search result list for the search query 108 as manually judged by the judge with the prediction of the search preference judgment of the first search result list and the second search result list for the search query 108 as determined by the prediction component 114. The annotator assessment component 702 can track performance of the judge based at least in part upon the comparison. Further, the annotator component 702 can receive a disparate search preference judgment of the first search result list and the second search result list for the search query 108 as manually judged by a disparate judge when the search preference judgment of the first search result list and the second search result list for the search query 108 as manually judged by the judge differs from the prediction of the search preference judgment of the first search result list and the second search result list for the search query 108. Moreover, the annotator assessment component 702 can track the performance of the judge based at least in part upon the disparate search preference judgment of the first search result list and the second search result list for the search query 108 as manually judged by the disparate judge.

FIGS. 8-11 illustrate exemplary methodologies relating to performing machine-assisted search preference evaluation. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 8:
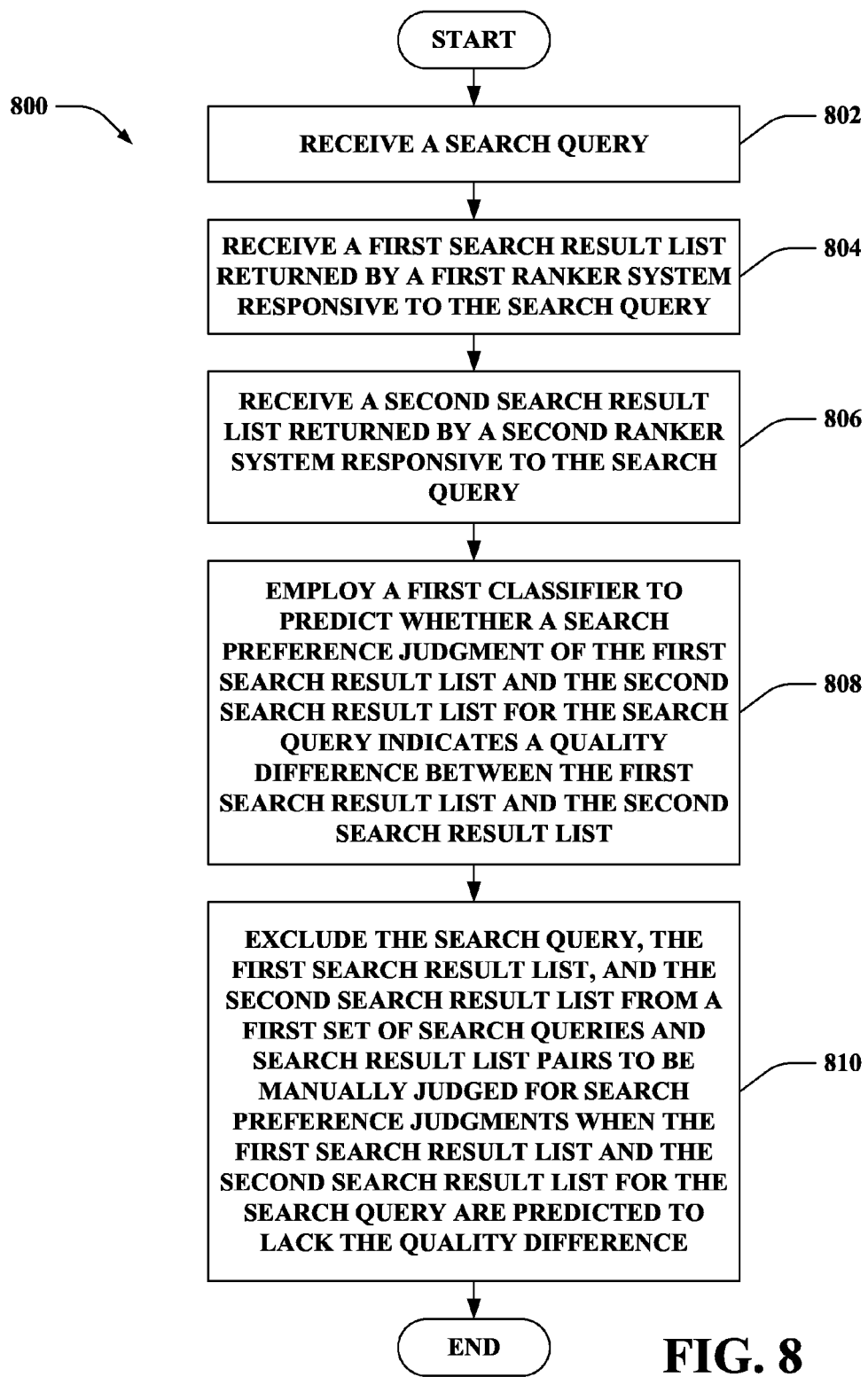
FIG. 8 is a flow diagram that illustrates an exemplary methodology of evaluating search preferences.

FIG. 8 illustrates a methodology 800 of evaluating search preferences. At 802, a search query can be received. At 804, a first search result list returned by a first ranker system responsive to the search query can be received. At 806, a second search result list returned by a second ranker system responsive to the search query can be received. At 808, a first classifier can be employed to predict whether a search preference judgment of the first search result list and the second search result list for the search query indicates a quality difference between the first search result list and the second search result list. The first classifier can predict whether the search preference judgment indicates the quality difference based upon values of features of the search query, the first search result list, and the second search result list. The search preference judgment, for instance, can be a side-by-side search preference judgment; however, the claimed subject matter is not so limited. At 810, the search query, the first search result list, and the second search result list can be excluded from a first set of search queries and search result list pairs to be manually judged for search preference judgments (e.g., side-by-side search preference judgments, etc.) when the first search result list and the second search result list for the search query are predicted to lack of the quality difference.

According to an example, when the first search result list and the second search result list for the search query are predicted to have the quality difference, then a second classifier can be employed to predict (e.g., based upon the values of the features) whether the search preference judgment indicates the first search result list or the second search result list is preferred for the search query. Following this example, a confidence level for whether the search preference judgment indicates the first search result or the second search result list is predicted can be determined. The search query, the first search result list, and the second search result list can be excluded from the first set of the search queries and the search result list pairs to be manually judged for the search preference judgments when the confidence level is above a threshold value. Rather, when the confidence level is above the threshold value, the search query, the first search result list, and the second search result list can be inserted in a second set of search queries and search result list pairs, which are labeled with preferences between search result lists as predicted by the second classifier. Alternatively, when the confidence level is equal to or below the threshold value, the search query, the first search result list, and the second search result list can be inserted in the first set to be manually judged.

Figure 9:
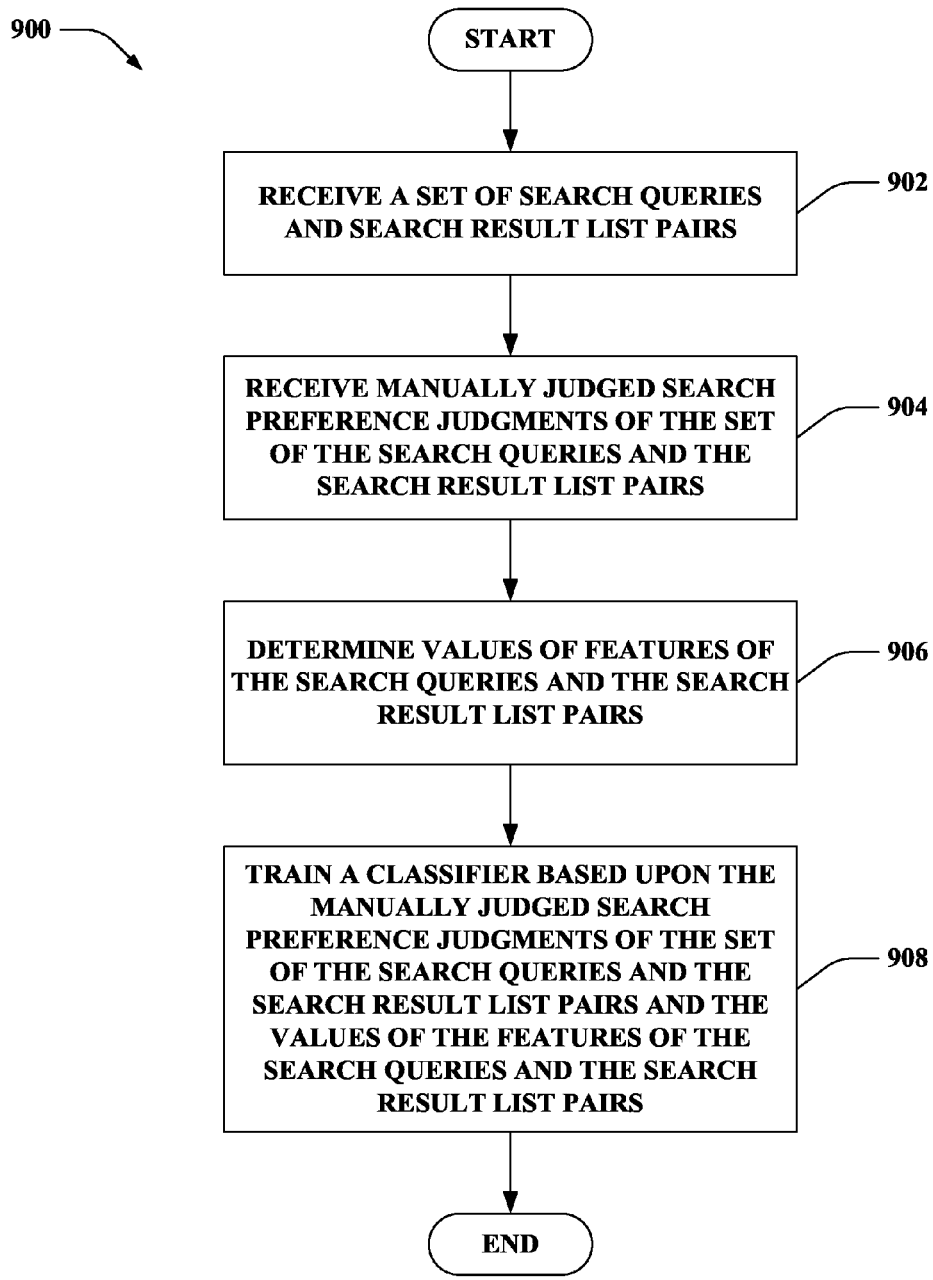
FIG. 9 is a flow diagram that illustrates an exemplary methodology of training a classifier to evaluate search preference judgments.

With reference to FIG. 9, illustrated is a methodology 900 of training a classifier to evaluate search preference judgments (e.g., side-by-side search preference judgments, etc.). At 900, a set of search queries and search result list pairs can be received. At 904, manually judged search preference judgments (e.g., manually judged side-by-side search preference judgments, etc.) of the set of the search queries and the search result list pairs can be received. At 906, values of features of the search queries and the search result list pairs can be determined. At 908, a classifier can be trained based upon the manually judged search preference judgments of the set of the search queries and the search result list pairs and the values of the features of the search queries in the search result list pairs. The classifier can be trained to generate predicted search preference judgments (e.g., predicted side-by-side search preference judgments, etc.).

Figure 10:
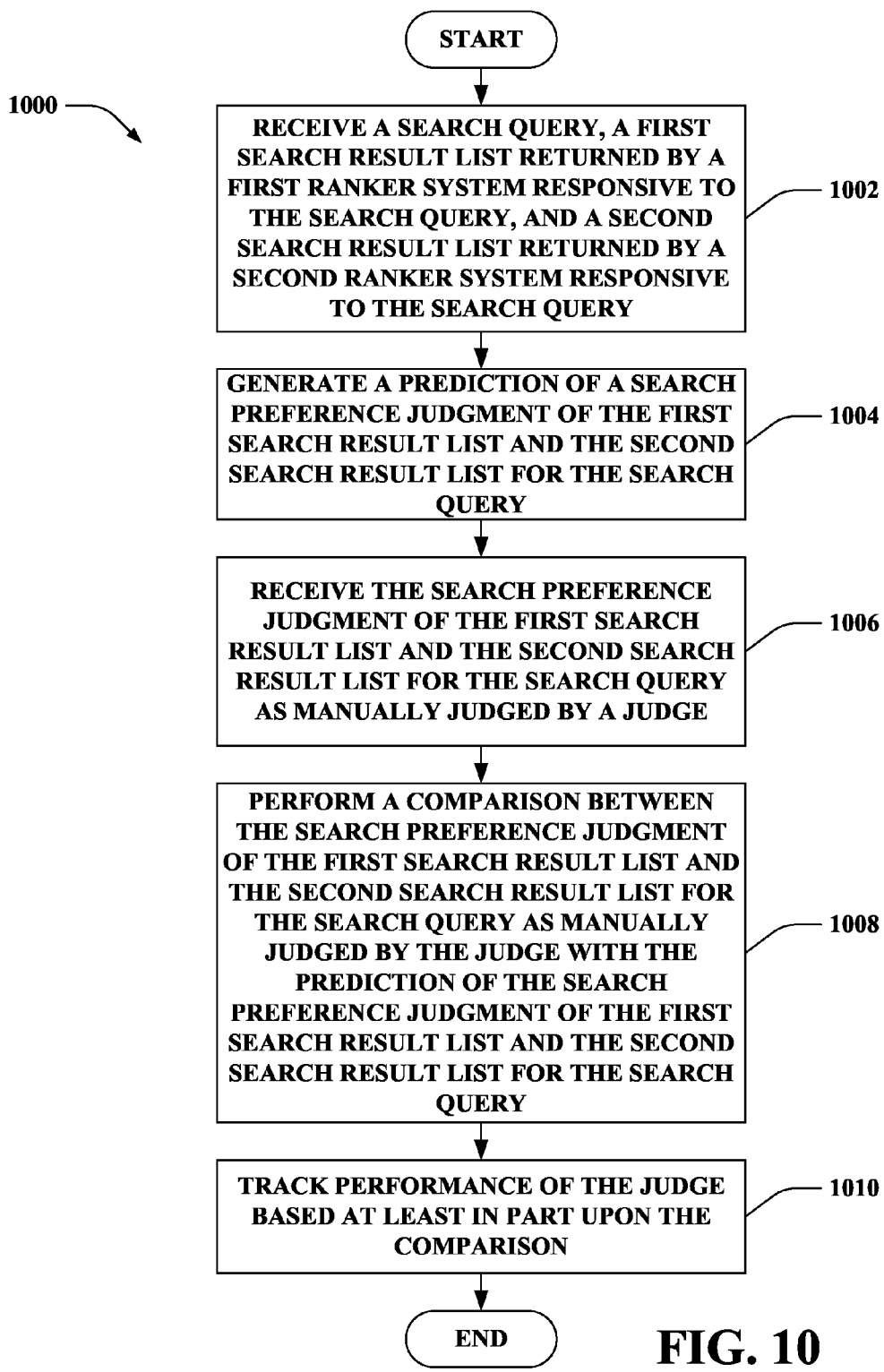
FIG. 10 is a flow diagram that illustrates an exemplary methodology of evaluating performance of a judge.

Now turning to FIG. 10, illustrated is a methodology 1000 of evaluating performance of a judge. At 1002, a search query, a first search result list returned by a first ranker system responsive to the search query, and a second search result list returned by a second ranker system responsive to the search query can be received. At 1004, a prediction of a search preference judgment (e.g., a side-by-side search preference judgment, etc.) of the first search result list and the second search result list for the search query can be generated. At 1006, the search preference judgment of the first search result list and the second search result list can be received for the search query as manually judged by a judge. At 1008, a comparison can be performed between the search preference judgment of the first search result list and the second search result list for the search query as manually judged by the judge with the prediction of the search preference judgment of the first search result list and the second search result list for the search query. At 1010, performance of the judge can be tracked based at least in part upon the comparison.

Figure 11:
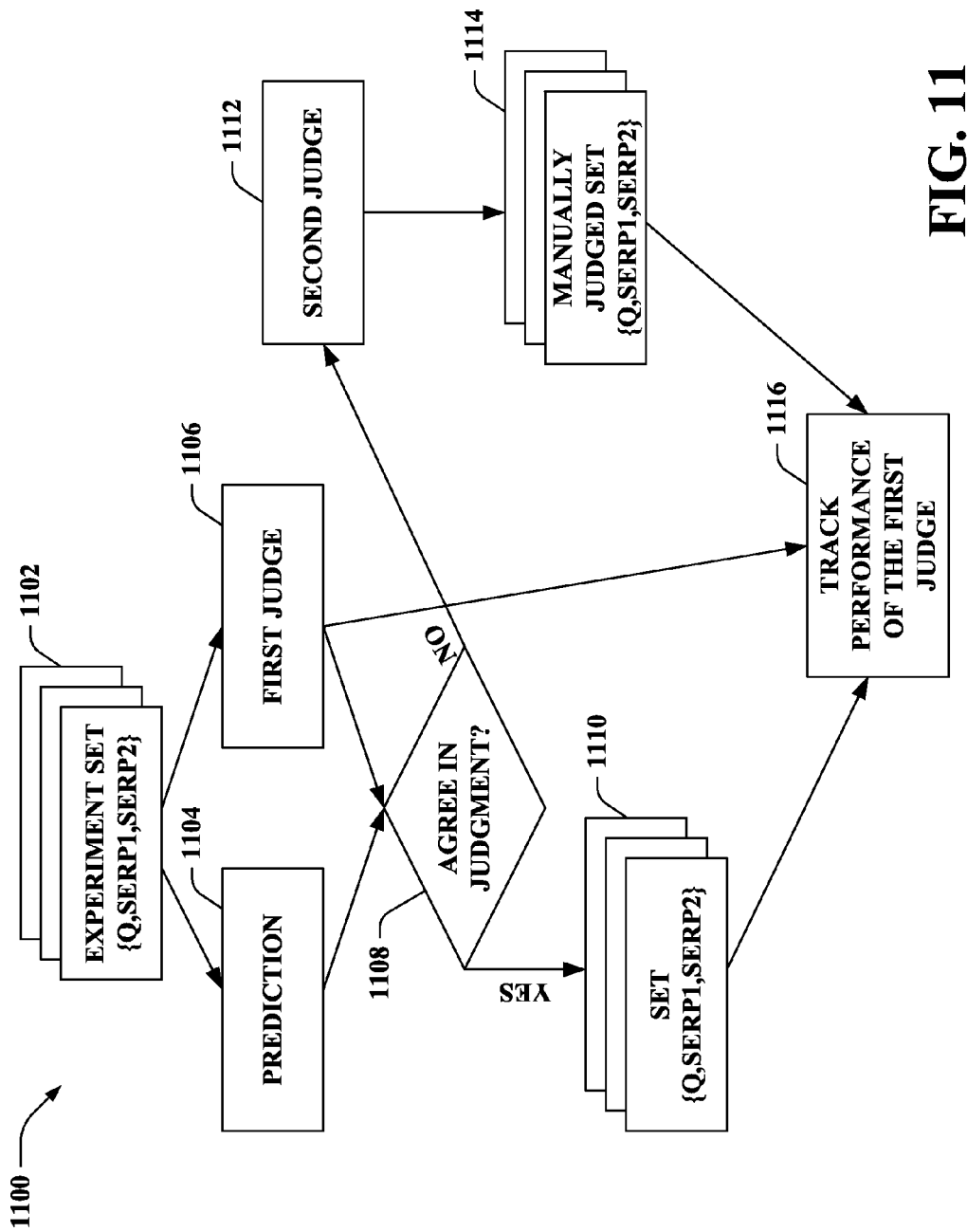
FIG. 11 is a flow diagram that illustrates another exemplary methodology of evaluating performance of a judge.

FIG. 11 illustrates another exemplary methodology 1100 of evaluating performance of a judge. At 1102, an experiment set (e.g., the experiment set 302) can be received. At 1104, a predicted search preference judgment (e.g., a predicted side-by-side search preference judgment, etc.) can be obtained using classifier(s). For instance, the prediction can indicate whether search result lists in a pair lack or have a difference in quality and/or which search result list from the pair is preferred. Moreover, a confidence level for the prediction can be determined. At 1106, a first judge can manually provide a search preference judgment. At 1108, the predicted search preference judgment can be compared to the manually judged search preference judgment from the first judge. Samples where there is agreement (as determined at 1108) between the predicted search preference judgment and the manually judged search preference judgment from the first judge can be inserted in a first set at 1110. Alternatively, samples where there is disagreement (as determined at 1110) between the predicted search preference judgment and the manually judged search preference judgment from the first judge can be judged by a second judge at 1112. Samples that are manually judged by the second judge can be inserted in a second set (e.g., manually judged set) at 1114. At 1116, the performance of the first judge can be tracked based upon the samples in the first set, the samples in the second set, and the manually judged preference judgments from the first judge. For instance, the performance of the first judge can be tracked to detect whether the first judge is a spammer or needs additional training by checking samples where the manual judgment of the first judge disagrees with predicted search preference judgments with high confidence levels. Such disagreement can be analyzed (e.g., to determine whether appropriate) based upon the manual judgment from the second judge.

Figure 12:
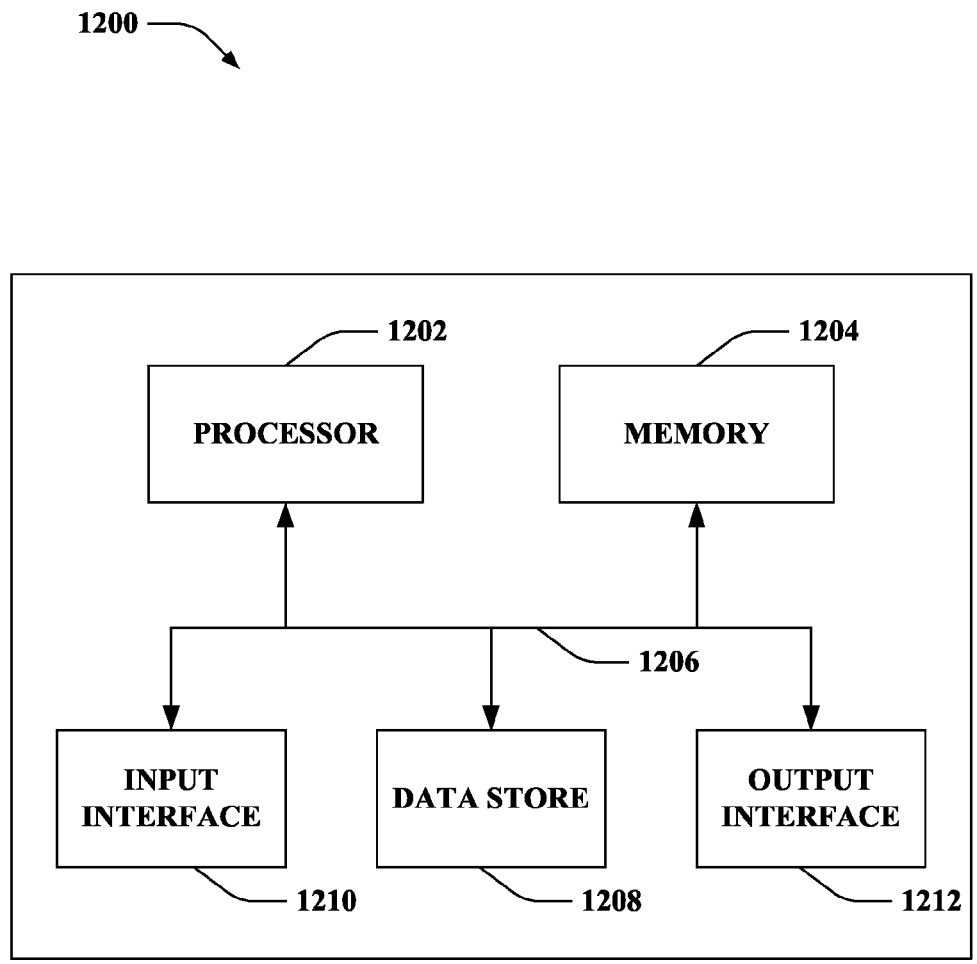
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be used in a system that evaluates search preference judgments. By way of another example, the computing device 120 can be used in a system that trains and/or retrains classifier(s) used to predict search preference judgments. In accordance with yet other examples, the computing device 120 can be utilized in a system that tracks performances of judges that manually judge search preference judgments. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store classifier(s), search queries and corresponding search result list pairs, predicted search preference judgments, manually judged search preference judgments, and so forth.

The computing device 1200 additionally includes a data store 1208 that is accessible by the processor 1202 by way of the system bus 1206. The data store 1208 may include executable instructions, classifier(s), search queries and corresponding search result list pairs, predicted search preference judgments, manually judged search preference judgments, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method that is executed by a computer processor on a computing device, the method comprising:
   receiving a first search result list returned by a first ranker system responsive to a search query;
   receiving a second search result list returned by a second ranker system responsive to the search query;
   employing a first classifier to predict whether a search preference judgment of the first search result list and the second search result list indicates a quality difference between the first search result list and the second search result list;
   when the first search result list and the second search result list for the search query are predicted to have the quality difference, determining a confidence level for whether the search preference judgment indicates one of the first search result list or the second search result list is preferred;
   inserting the search query, the first search result list, and the second search result list in a first set of search queries and search result list pairs to be manually judged for search preference judgments when:
      the first search result list and the second search result list for the search query are predicted to have the quality difference; and
      the confidence level is equal to or below a threshold value;
   wherein the search query, the first search result list, and the second search result list are otherwise excluded from the first set of the search queries and the search result list pairs to be manually judged for search preference judgments; and
   transmitting the first set of the search queries and the search result list pairs to one or more annotator computing devices for manual judgment.

2. The method of claim 1, further comprising:
   receiving the search preference judgments of at least a portion of the first set of the search queries and the search result list pairs as manually judged; and
   comparing performances of the first ranker system and the second ranker system based upon the search preference judgments of the first set of the search queries and the search result list pairs as manually judged.

3. The method of claim 1, further comprising:
   receiving the search preference judgments of at least a portion of the first set of the search queries and the search result list pairs as manually judged; and
   retraining the first classifier based upon the search preference judgments of the first set of the search queries and the search result list pairs as manually judged.

4. The method of claim 1, further comprising:
   when the first search result list and the second search result list for the search query are predicted to have the quality difference, employing a second classifier to predict whether the search preference judgment indicates the first search result list or the second search result list is preferred for the search query;
   wherein the second classifier predicts whether the search preference judgment indicates the first search result list or the second search result list is preferred based upon values of features of the search query, the first search result list, and the second search result list.

5. The method of claim 4, further comprising:
   inserting the search query, the first search result list, and the second search result list in a second set of search queries and search result list pairs when the confidence level is above the threshold value, wherein the search queries and the search result list pairs in the second set are labeled with preferences between search result lists as predicted by the second classifier, and wherein the preferences have respective confidence levels above the threshold value;
   receiving the search preference judgments of at least a portion of the first set of the search queries and the search result list pairs as manually judged; and
   comparing performances of the first ranker system and the second ranker system based upon the search preference judgments of the first set of the search queries and the search result list pairs as manually judged and the preferences between the search result lists in the second set as labeled.

6. The method of claim 4, further comprising:
   receiving the search preference judgments of at least a portion of the first set of the search queries and the search result list pairs as manually judged; and
   retraining the first classifier and the second classifier based upon the search preference judgments of the first set of the search queries and the search result list pairs as manually judged.

7. The method of claim 4, wherein the second classifier is the first classifier.

8. The method of claim 1, further comprising:
receiving the search preference judgment of the first search result list and the second search result list for the search query as manually judged by a judge;
performing a comparison between:
the search preference judgment of the first search result list and the second search result list for the search query as manually judged by the judge; and
a prediction of the search preference judgment of the first search result list and the second search result list for the search query; and
tracking performance of the judge based at least in part upon the comparison.

9. The method of claim 1, wherein the first ranker system and the second ranker system are search engines.

10. The method of claim 1, wherein the first ranker system and the second ranker system are desktop search tools.

11. The method of claim 1, wherein the first classifier is a binary classifier.

12. The method of claim 1, wherein the first classifier predicts whether the search preference judgment indicates the quality difference based upon values of features of the search query, the first search result list, and the second search result list.

13. The method of claim 12, wherein the features comprise one or more of query features, relevance features, click-based features, features of titles, features of snippets, or diversity features.

14. A system that evaluates search preferences, comprising:
at least one processor; and
memory that comprises computer-executable instructions that, when executed by the at least one processor, cause the at least one processor to perform acts including:
receiving a search query, a first search result list returned by a first ranker system responsive to the search query, and a second search result list returned by a second ranker system responsive to the search query;
generating a prediction of a search preference judgment of the first search result list and the second search result list for the search query; and
transmitting the search query, the first search result list, and the second search result list to an annotator computing device for manual judgment by a judge when the prediction of the search preference judgment specifies:
the first search result list and the second search result list for the search query are predicted to have a quality difference; and
a confidence level that one of the first search result list or the second search result list is preferred is predicted to be equal to or below a threshold value;
wherein the search query, a first search result list, and the second search result list are otherwise inhibited from being transmitted for manual judgment.

15. The system of claim 14, wherein generating the prediction of the search preference judgment of the first search result list and the second search result list for the search query further comprises:
employing a classifier to predict whether the search preference judgment and the second search result list for the search query indicates the quality difference between the first search result list and the second search result list;
wherein the classifier predicts whether the search preference judgment indicates the quality difference based upon values of features of the search query, the first search result list, and the second search result list.

16. The system of claim 14, wherein generating the prediction of the search preference judgment of the first search result list and the second search result list for the search query further comprises:
employing a classifier to predict whether the search preference judgment indicates the first search result list or the second search result list is preferred for the search query;
wherein the classifier predicts whether the search preference judgment indicates the first search result list or the second search result list is preferred based upon values of features of the search query, the first search result list, and the second search result list.

17. The system of claim 14, the memory further comprising computer-executable instructions that, when executed by the at least one processor, cause the at least one processor to perform acts including:
receiving, from the annotator computing device, the search preference judgment of the first search result list and the second search result list for the search query as manually judged by the judge when the search query, the first search result list, and the second search result list are transmitted to the annotator computing device;
performing a comparison between:
the search preference judgment of the first search result list and the second search result list for the search query as manually judged by the judge; and
the prediction of the search preference judgment of the first search result list and the second search result list for the search query; and
tracking performance of the judge based at least in part upon the comparison.

18. The system of claim 17, the memory further comprising computer-executable instructions that, when executed by the at least one processor, cause the at least one processor to perform acts including:
receiving a disparate search preference judgment of the first search result list and the second search result list for the search query as manually judged by a disparate judge when the search preference judgment of the first search result list and the second search result list for the search query as manually judged by the judge differs from the prediction of the search preference judgment of the first search result list and the second search result list for the search query; and
tracking the performance of the judge based at least in part upon the disparate search preference judgment of the first search result list and the second search result list for the search query as manually judged by the disparate judge.

19. A computer-readable storage medium including computer-executable instructions that, when executed by a processor, cause the processor to perform acts including:
receiving a set of search queries and search result list pairs, wherein search result lists in the search result list pairs are respectively returned by a first ranker system and a second ranker system responsive to the search queries;
receiving manually judged side-by-side search preference judgments of the set of the search queries and the search result list pairs;
determining values of features of the search queries and the search result list pairs; and training one or more classifiers based upon the manually judged side-by-side search preference judgments of the set of the search queries and the search result list pairs and the values of the features of the search queries and the search result list pairs, wherein the one or more classifiers are trained to generate predicted side-by-side search preference judgments and confidence levels for the predicted side-by-side search preference judgments.

20. The computer-readable storage medium of claim 19, wherein the computer-executable instructions, when executed by the processor, further cause the processor to perform acts including:

receiving a first search result list returned by the first ranker system responsive to a particular search query;

receiving a second search result list returned by the second ranker system responsive to the particular search query; and employing the one or more classifiers as trained to generate a predicted side-by-side search preference judgment of the first search result list and the second search result list for the particular search query and a confidence level for the predicted side-by side search preference judgment.

* * * * *